(12) United States Patent
Chapman et al.

(10) Patent No.: US 7,496,632 B2
(45) Date of Patent: Feb. 24, 2009

(54) METHOD AND SYSTEM FOR DISTRIBUTING A PUBLIC INFORMATION RELEASE AUTHORIZATION (PIRA) FORM OVER AN INTRANET

(75) Inventors: Connie L. Chapman, Manassas, VA (US); Melani Langston, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 914 days.

(21) Appl. No.: 10/617,065

(22) Filed: Jul. 10, 2003

(65) Prior Publication Data
US 2004/0010557 A1 Jan. 15, 2004

Related U.S. Application Data

(63) Continuation-in-part of application No. 09/596,629, filed on Jun. 19, 2000.

(60) Provisional application No. 60/146,254, filed on Jul. 29, 1999, provisional application No. 60/141,306, filed on Jun. 28, 1999.

(51) Int. Cl.
*G06F 15/16* (2006.01)
(52) U.S. Cl. ..................... 709/206; 709/218
(58) Field of Classification Search ............ 709/206
See application file for complete search history.

(56) References Cited

U.S. PATENT DOCUMENTS 5,222,236 A * 6/1993 Potash et al. ............ 707/102
5,247,661 A 9/1993 Hager et al. ............ 395/600
5,276,869 A 1/1994 Forrest et al. ............ 395/600
5,377,355 A 12/1994 Hager et al. ............ 395/650
6,243,722 B1 6/2001 Day et al. ................. 707/512
6,356,909 B1 * 3/2002 Spencer .................... 707/10
6,507,865 B1 * 1/2003 Hanson et al. ............ 705/36 R
6,553,407 B1 * 4/2003 Ouchi ..................... 709/206
6,704,906 B1 * 3/2004 Yankovich et al. ........ 715/505
7,233,950 B2 * 6/2007 Smith, III ................. 707/10
7,441,004 B2 * 10/2008 Lip et al. .................. 709/206

* cited by examiner

*Primary Examiner*—Douglas B Blair
(74) *Attorney, Agent, or Firm*—Allen, Dyer, Doppelt, Milbrath & Gilchrist, P.A.

(57) ABSTRACT

A method for distributing a public information release authorization (PIRA) form over an intranet includes creating and submitting a PIRA form over the intranet, with the PIRA form being submitted by an author to at least one approver via e-mail with a hyperlink to the PIRA form. Comments for the PIRA form are transmitted by the approver via e-mail. The intranet includes a plurality of users enrolled therein with each user having associated personnel information stored within the intranet. The method further includes selecting a first level of approvers from among the plurality of users for reviewing the PIRA form, and transmitting a first notification message via e-mail to the first level of approvers. The first notification message has a hyperlink to the PIRA form. The first level of approvers may include a manager, a program manager and a technical peer reviewer.

39 Claims, 11 Drawing Sheets

**Site Information\*:**
[Select One ▼] — 202

**Submission Deadline\*:** — 208
(mm/dd/yyyy)
[____] Calender — 210

Today's Date: (mm/dd/yyyy) — 211

**Title\*:** — 204
[____]

**Type\*:** — 213
[Select One ▼] — 214

Does the paper include any company Proprietary Information?* ○Yes ○No
Does the paper include any DOD Classified Information?* ○Yes ○No.

AUTHORS\* — 206

[Add Author] [Edit Author] [Delete Author]
   214         216            218

**Abstract\*:** — 234

Calendar popup — 212:
[Month ▼] [Year ▼]
<< < Today > >>
Su Mo Tu We Th Fr Sa
 1  2  3  4  5  6  7
 8  9 10 11 12 13 14
15 16 17 18 19 20 21
22 23 24 25 26 27 28
29 30 31

*FIG. 4*

Author Form

Use one of the two methods below to add Author Information

1. If the author is in the company directory, click on the "Select from User Directory" button.
2. If the author is not in the company directory, type the Information on the form below.

All fields are required fields for submission

[ Select from User Directoy ] — 220

In Company Directory: ○Yes ○No

Author Name: _____ — 222
(Last name, First name)

Author NT Userid: _____ — 224
(Company only)

Telephone: _____ — 226

Building/Mail Stop (Company) _____ — 228
or Company Name (External): (e.g., 105/029)

Author E-Mail: _____ — 230

[Save] [Cancel] — 232

FIG. 5

Abstract*: ——— 234
Keywords*: ——— 236
Organization*: [No organizations found. Select a Site above.] ——— 238
Full Title of Conference/Publication/Subject Matter*: ——— 240
Conference/Publication/Subject Matter Date*: [ ] Calendar ——— 242
Conference/Publisher Location*: ——— 244
Conference Sponsor*: ——— 246
Is this Conference/Publication/Subject Matter restricted to U.S. persons only?* ○Yes ○No ——— 248
Is the subject matter based on, associated with, or related to any past or current government program or contract (classified or unclassified)?* ○Yes ○No ——— 250
If yes, Program/Contract Title: ——— 252
If yes, Program/Contract Number: ——— 254
If yes, Program/Contract Classification: ——— 256

If yes, Program/Contract Administrator: [_____]—258

If yes, has the government customer approved the release of this information/subject matter? ○Yes ○No ○N/A —260

If yes, demonstrate customer approval:

Name of Approver: [_____]—262

Agency/Customer: [_____]—264

Use the attachment option to upload the approval documentation.

If no, why was the subject matter developed/created? [_____]—266

If no, how was the subject matter/development/research funded? [_____]—268

Does the paper relate to an IR&D project?* ○Yes ○No —270

If yes, identify the IR&D project name: [_____]—272

Does the disclosed subject matter relate to any previously submitted invention disclosure(s) or pending patent applications?* ○Yes ○No —274

If yes, please identify: [_____]—276

Does the disclosure include any subject matter that should be protected by patents or trade secrets?* ○Yes ○No —278

If yes, please identify: [_____]—280 clear

Has the data been published and released in
the public before?*  ○Yes ○No —282

If yes, please identify how, when and where
the data was entered into the public domain:  —284

Does the final releasable item include a
Copyright Notice per company directive?  ○Yes ○No —286

Has the data been through Directorate of
Freedom of Information Security Review
(DFOISR) at DOD?*  ○Yes ○No —288

If yes, has the data been modified with
administrative changes since its release into
the public?  ○Yes ○No —290

If yes, has the technical content been
modified?  ○Yes ○No —292

If yes, enter the DFOISR Number(s):  —294

Author's Manager*:  —296

Technical Peer Reviewer:  clear —298

Program Manager (project lead)*:  —300

FIG. 8

METHOD AND SYSTEM FOR DISTRIBUTING A PUBLIC INFORMATION RELEASE AUTHORIZATION (PIRA) FORM OVER AN INTRANET

RELATED APPLICATION

This application is a continuation-in-part of co-pending application Ser. No. 09/596,629 filed Jun. 19, 2000, which is based upon prior filed provisional application Ser. No. 60/141,306 filed Jun. 28, 1999, and provisional application Ser. No. 60/146,254 filed Jul. 29, 1999, the entire disclosures of which are incorporated herein by reference.

FIELD OF THE INVENTION

The present invention relates to the field of data processing, and more particularly, to a method and system for processing a public information release authorization (PIRA) form.

BACKGROUND OF THE INVENTION

Obtaining approval on information being released to the public is a problem within large companies. This process generally requires the author to fill out a release authorization form, and mail a paper copy to an administrator (such as the IP administrator) that is set up to coordinate and handle this task. Upon receipt of the release authorization form, the IP administrator assigns a tracking number and forwards a copy of the release authorization form along with the information to be released to the appropriate approvers. The approvers receive the information by inter-office mail, or by hand.

A recommendation by each approver is then mailed back to the IP administrator. This process is labor intensive. That is, all correspondence between the author, the intellectual property department, the approvers, and other necessary parties are self-initiated. Consequently, there is a need for a user-friendly release authorization process that automatically distributes electronic documents within a data processing system.

SUMMARY OF THE INVENTION

In view of the foregoing background, an object of the present invention is to provide a method and associated system that improves the distribution of electronic documents within a data processing system.

This and other objects, advantages and features in accordance with the present invention are provided by a method for distributing a public information release authorization (PIRA) form over an intranet. The method comprises creating and submitting a PIRA form over the intranet, with the PIRA form being submitted by an author to at least one approver via e-mail with a hyperlink to the PIRA form. Comments for the PIRA form are transmitted by the at least one approver via e-mail.

The PIRA process is used to approve the internal and external release of technical papers, abstracts, presentations, reports, journal articles, books, videos and other information intended for presentation or publication outside of a particular corporation. The PIRA process helps to speed up the time normally required to obtain approval, particularly when the information is to be reviewed by a half a dozen or more approvers.

The e-mail messages are easily transmitted and received between users within the intranet for prompting review of the PIRA form by the appropriate approvers. The hyperlinks embedded within selected e-mail messages allows an approver to access the PIRA form to provide a user-friendly and efficient method of distributing a PIRA form within an organization or company for review.

The intranet includes a plurality of users enrolled therein with each user having associated personnel information stored within the intranet. The method further comprises selecting a first level of approvers from among the plurality of users for reviewing the PIRA form, and transmitting a first notification message via e-mail to the first level of approvers. The first notification message has a hyperlink to the PIRA form.

The first level of approvers may comprise at least one of a manager, a program manager and a technical peer reviewer. The first level of approvers may be selected by the author, with selection of the technical peer reviewer being optional. Alternatively, the method may further comprise creating a profile of the PIRA form in response to accessing associated personnel information of the author, and at least one of the first level of approvers is automatically selected based upon the created profile. The first level of approvers preferably review the PIRA form concurrently.

The method may further comprise selecting a second level of approvers from among the plurality of users for reviewing the PIRA form, and transmitting a second notification message via e-mail to the second level of approvers. The second notification message also has a hyperlink to the PIRA form.

The second level of approvers may comprise at least one of a security administrator, a system administrator, a contracts administrator, a communications administrator, an export/import administrator and a legal administrator. Typically, the second level of approvers may include as a minimum the legal administrator, the contracts administrator and the communications administrator. Additional approvers, such as the security administrator and the export/import administrator may be selected by the system administrator. In addition, the second level of approvers preferably review the PIRA form sequentially. At this second level of review, the process is stopped when one of the approvers rejects the PIRA form.

Another aspect of the present invention is directed to an intranet for distributing a PIRA form that includes a first software module for creating and submitting a PIRA form over the intranet, with the PIRA form being submitted by an author to at least one approver via e-mail with a hyperlink to the PIRA form. A second software module transmits comments for the PIRA form by the at least one approver via e-mail.

Yet another aspect of the present invention is directed to a computer-readable medium having computer-executable instructions for causing user computers coupled to at least one server and defining an intranet therewith to perform certain steps. The steps comprise creating and submitting a public information release authorization (PIRA) form over the intranet using a first one of the user computers cooperating with the at least one server. The PIRA form may be submitted by an author to at least one approver via e-mail with a hyperlink to the PIRA form. Comments for the PIRA form may be transmitted by the at least one approver via e-mail using a second one of the user computers cooperating with the at least one server.

BRIEF DESCRIPTION OF THE DRAWINGS

FIGS. 3-13 are user interface displays for the PIRA approval process in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
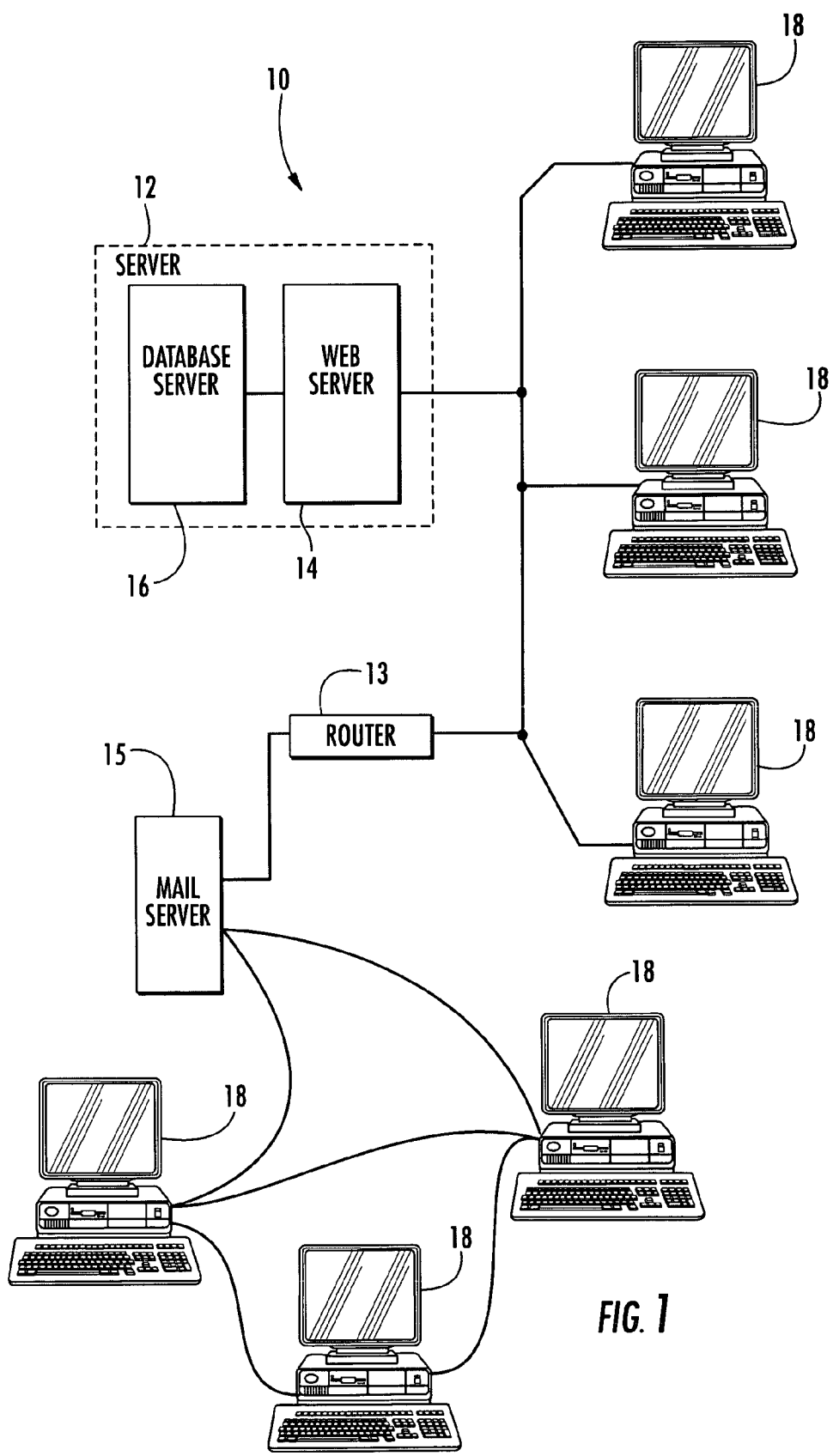
FIG. 1 is a schematic diagram of an intranet system used to implement a public information release authorization (PIRA) process in accordance with the present invention.

A public information release authorization (PIRA) process according to the present invention is implemented in an intranet 10, as shown in FIG. 1. This intranet 10 may be localized within a corporation or business site, or may even be configured to link more than one division of a corporation together. The intranet is separated from the rest of the internet by a firewall, which is a hardware/software combination that protects the intranet from unauthorized users, as readily understood by one skilled in the art.

A key component of the intranet is an e-mail system and a web browser for implementing the PIRA process. The e-mail system may use normal internet e-mail addresses, except that it routes traffic within an organization so the e-mail need not travel outside the intranet. Internal routers 13 and mail servers 15 send the mail to other corporate employees via the intranet. E-mail that travels to and from the internet from the intranet goes through the firewall. The PIRA process may also be implemented over the internet using an encrypted or secured connection. For instance, remote sites are able to upload information to the intranet database server 10.

E-mail messages are easily transmitted and received between users within the intranet 10 for providing notification and status of a particular PIRA form. Furthermore, hyperlinks embedded within selected e-mail messages allow a user to access a particular PIRA form, as will be described in greater detail below.

The intranet 10 offers access only to enrolled or authorized users. That is, each user requires a selected password to match their user name prior to viewing a PIRA form. A server 12 processes the method according to the present invention. In one embodiment, the server 12 includes a web or document server 14 that interfaces with a separate database server 16. Alternatively, the web server 14 and the database server 16 can be a single server 12, wherein the server would include a hierarchical tree structure containing files pertaining to those stored in the database server. The server 12 is not limited to any particular operating system for implementing the PIRA process. Individual computers 18 are connected to the servers 12. In one embodiment, each personal computer 18 includes a web browser since the PIRA process is web-based.

Information necessary for the PIRA process is stored within the database server 16. In one embodiment, the intranet 10 uses active server web pages instead of static web pages, as readily understood by one skilled in the art. The web server 14 thus uses the active server pages to interact with the database server 16 to extract the necessary information and construct each hypertext markup language (html) page to be provided to the user. Whenever a change is made to any of the displays resulting from the PIRA process, these displays are automatically updated by the web server 14 so that each time a user logs into the PIRA process, the web server 14 provides the updated pages.

The PIRA process in accordance with the present invention is used to approve the internal and external release of technical papers, abstracts, presentations, reports, journal articles, books, videos and other information intended for presentation or publication outside of a particular corporation. The PIRA process helps to speed up the time normally required to obtain approval, particularly when the information is to be reviewed by a half a dozen or more approvers.

Figure 2:
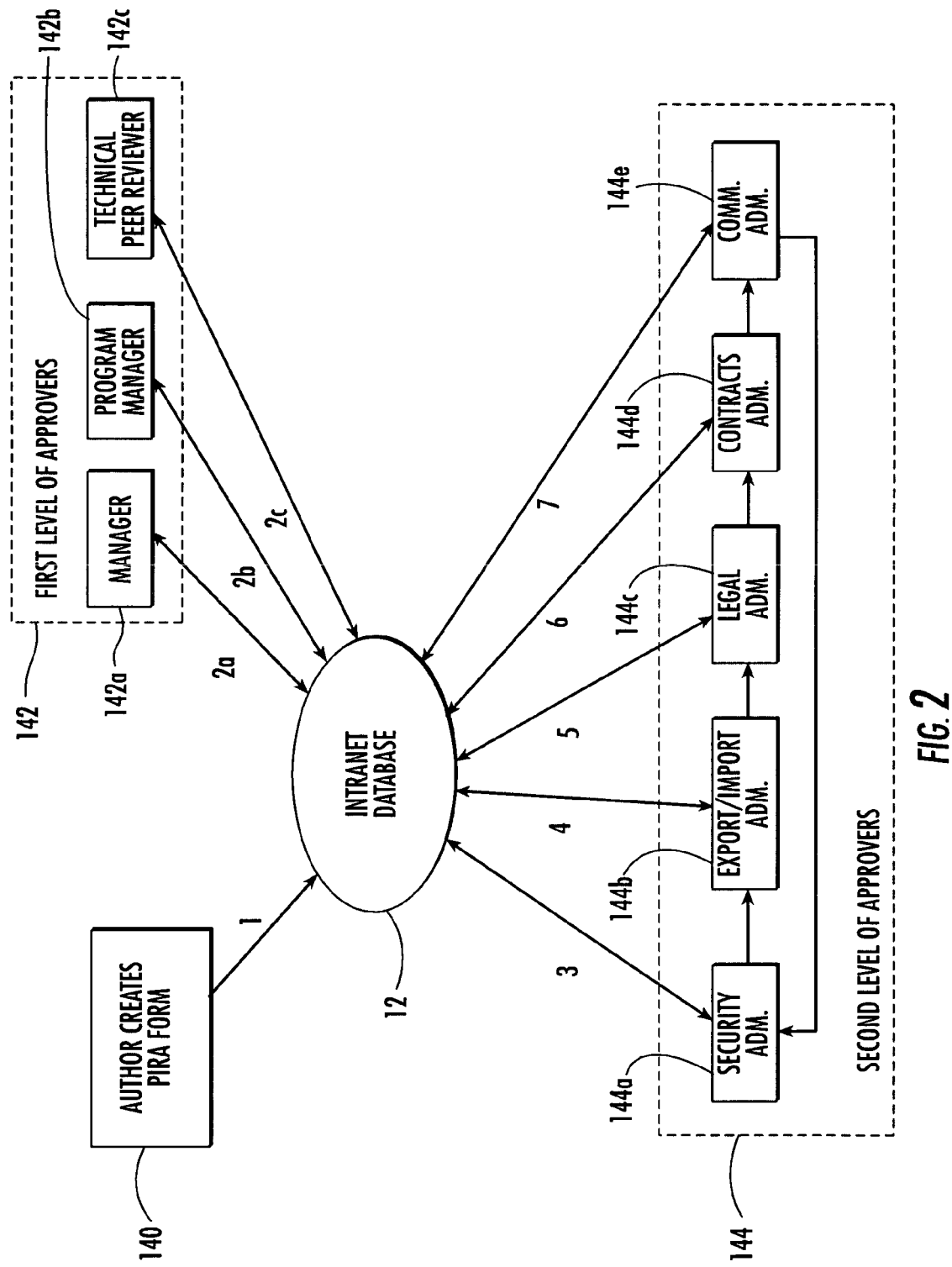
FIG. 2 is a high level flow chart illustrating how a public information release authorization (PIRA) form is created and approved over an intranet in accordance with the present invention.

Referring now to FIG. 2, a high level flow chart illustrating how a PIRA form is created and approved over an intranet 10 in accordance with the present invention will be described. From the start (Block 140), the author creates a PIRA form using a template provided by the server 12. After the PIRA form has been created and the author is satisfied with its contents, the PIRA form is then submitted to the server 12.

The intranet 10 includes a plurality of users enrolled therein with each user having associated personnel information stored within the intranet. A first notification message is transmitted via e-mail to a first level of approvers at block 142. The first notification message has a hyperlink to the PIRA form.

The first level of approvers is selected from among the plurality of users. The first level of approvers may include a manager 142a, a program manager 142b, and a technical peer reviewer 142c, for example. The first level of approvers is selected by the author when the PIRA form is initially created. In one embodiment, a default of the PIRA process includes the manager and the program manager, with the technical peer reviewer being an optional selection by the author. Alternatively, a profile of the PIRA form may be created in response to accessing associated personnel information of the author, and at least one of the first level of approvers (such as the author's manager 142a) is automatically selected based upon the created profile.

The first level of approvers preferably reviews the PIRA form concurrently, that is, they are all able to review and comment on the PIRA form at the same time. Comments generated and transmitted by the first level of approvers 142a-142c are provided to the server 12. These comments can then be reviewed by the author.

If the first level of approvers approves the PIRA form, then a second level of approvers for reviewing the PIRA form is selected from among the plurality of users at block 144, otherwise, the PIRA form approval process stops. A second notification message is transmitted via e-mail to the second level of approvers. The second notification message also has a hyperlink to the PIRA form.

The second level of approvers includes a security administrator 144a, an export/import administrator 144b, a legal administrator 144c, a contracts administrator 144d and a communications administrator 144e, for example. The contracts administrator 144d is necessary if the information to be released is derived from a government contract. The communications administrator 144e is primarily responsible for checking the format and grammar of the information to be released.

Typically, the second level of approvers may include as a minimum the legal administrator, the contracts administrator and the communications administrator. Additional approvers, such as the security administrator and the export/import administrator may be selected by the system administrator. The second level of approvers review the PIRA form sequentially, that is, one at a time. As illustrated in Block 144, the security administrator 144a reviews the PIRA form at the beginning and at the end of this level of review. The security administrator 144a initially reviews the PIRA form to determine if it is worthwhile to release, and if so, then the PIRA form is passed to the next approver in line. After the PIRA form has successfully passed through the other approvers 144b-144e, the security administrator 144a again reviews the PIRA form. This time to determine if the author has made any comments, and if so, what is the impact on the information to be released.

If the PIRA form is rejected or if additional material is being added by any one of the second level of approvers 144a-144e, then the PIRA form returns to the beginning of the approval process. However, if information is being removed, the PIRA process continues.

Comments generated and transmitted by the second level of approvers are provided to the server 12. These comments can then be reviewed by the author. As noted above, the second level of approvers reviews the PIRA form sequentially. Consequently, once the security administrator 144a reviews and approves the PIRA form at the end of the second level of review, the information is approved for release.

The application implementing the PIRA process may be accessed from the invention disclosure process disclosed in application Ser. No. 60/141,306, or by the PIRA application's web address. A user id and password are required before viewing a PIRA form. When accessing the PIRA application, the home page is initially displayed, as shown in FIG. 2. Referring now to FIGS. 2-13, one embodiment of display formats for the PIRA form approval process will be described.

To prepare a new PIRA form, the user clicks on "Prepare a New PIRA" at field 200. Clicking on field 200 causes a new PIRA form to be displayed, as shown in FIG. 4. Required fields to be filled are indicated with an asterisk. The author will not be able to submit the PIRA form until the required fields are filled in. When saving the PIRA form as a draft, the author will need to complete, as a minimum, the following fields: site name (field 202), title (field 204) and author(s) (field 206).

In field 202, the author selects the appropriate site in a Site Information drop-down box. In field 208, the date is filled in automatically. In field 210, the author types in the submission deadline, which is the date the information needs to be submitted to an outside agency for publication. For assistance, the user has the option of viewing a pop-up calendar 212 when choosing the submission date. If the information to be released requires government approval before initial publication, a substantial lead time, such as 2 months or more, for example, may be required for the PIRA approval process.

The title of the information to the released is entered in field 204. The author chooses the type of information being released at field 214 from a pull-down menu. The pull-down menu (not shown) includes at least the following, for example: abstract, draft article (publication), final article (publication), presentation (charts only), book, video and World Wide Web item. The author is also required to answer at field 211 whether the information to be released includes any proprietary information, and at field 218 213 as to whether the information includes any Department of Defense (DOD) classified information. In the illustrated embodiment, the PIRA process is not set up to deal with DOD classified information, and consequently, classified information is not to be entered.

The name of the author submitting the information is entered at field 206. The default name for this field is the user preparing the new PIRA form. However, if the user is creating the PIRA form for another person, then the user should not delete their name from the author list. Otherwise, if the user creating the PIRA form is not listed as an author, the user will not be able to submit, edit, delete or view the new PIRA form after being saved.

If the author wants to add additional authors to the submission, the initiating author clicks on the "Add Authors" field 214, and then adds the additional authors. If the author wants to edit information about any of the additional authors listed, the user clicks on the "Edit Authors" field 216. Similarly, if the author wants to delete a listed additional author, the author clicks on field 218.

When the author clicks on the "Add Author" field 214, the "Author Form" as shown in FIG. 5 will be displayed. The author may return to the submission form by saving, canceling, or using the browser's back button. There are two ways to select an additional author. If the additional author is a company employee or subcontractor who would be in the corporate user directory, the author clicks on the "Select from User Directory" field 220. An author selection window will appear, and the author enters the last name (or partial last name) of the additional author and clicks on the "search" field.

The author may also search by the department number of the additional author by selecting the "dept" field. The search results list will appear in the window. If the additional author is in the list, then the author clicks on the name. The Author Selector window will then close, and the author's information is entered into fields 222-230. After reviewing the displayed author information, the author clicks "Save" or "Cancel" to return to the PIRA form. The additional author's name will now be on the PIRA form.

If the additional author is not in the corporate user directory, then the necessary information is typed into the PIRA form. All the fields, except for the NT User id (field 224), must be filled in. After entering the additional author's information, the author clicks on the "Save" or "Cancel" field 232 to return to the PIRA form. The additional author's name will now be on the form.

The next section of the PIRA form asks for general information about the author's submission. In the abstract field 234 (FIG. 6) the author provides a summary of the information. If this information is in another format (e.g., Word, PowerPoint), the author may add it as an attachment after the PIRA form is saved. The author should type "see attachment" in this field.

In the "keywords" field 236, pertinent words or acronyms related to the information are provided. It is particularly useful to list synonyms and related words that best describe the topic of the information. When selecting the organization field 238, a drop-down box will display an organization listing specific to the site selected in the "site information" field 202. The author chooses the appropriate organization from the list provided.

The next fields 240-248 ask for information about where the information will be published or presented. The following information is to be entered: Full Title of Conference/Publication/Subject Matter in field 240, Conference/Publication/Subject Matter Date in field 242, Conference/Publisher Location in field 244, and Conference Sponsor/Publisher in field 246. The author is to also answer in field 248 whether the Conference/Publication/Subject Matter is restricted to U.S. persons only.

The next fields 250-272 are directed to the origin of the subject matter with respect to the information being released, particularly whether or not the subject matter is derived from any work done on a government contract. In field 250, the author answers whether the subject matter is based on, associated with, or related to any past or current government program or contract (classified or unclassified). This must be answered by all the authors.

The author then answers a series of other questions, based on whether the answer in field 250 is yes. If the answer is yes, the author then list the Program/Contract Title in field 252, the Program/Contract Number in field 254, the Program/Contract Classification (classified or unclassified) in field 256, and the Program/Contract Administrator in field 258 (FIG. 7). Finally, the author must select the "yes", "no" or "N/A" field 260 to answer the question, "Has the government customer approved the release of this information/subject matter?" If the answer is yes, the author should then write the name of the approver in field 262 and the agency/customer in field 264 who approved the release.

If the subject matter of the information being submitted is not related to a government program or contract, then the author answers the following "why was the subject matter developed/created?" in field 266, and "how was the subject matter/development/research funded?" in field 268. The next question asks if the information relates to an IR&D (Independent Research and Development) project in field 270. If the answer is "yes," the author enters the IR&D project name in field 272.

The next series of questions in the PIRA form relates to invention disclosures or patent applications. If the subject of the information is related to any previously submitted invention disclosure or pending patent, then field 274 is answered yes, and the applicable invention disclosures and patents are listed in field 276. Similarly, if the subject of the information should be protected by patents or trade secrets, the author clicks "yes" in field 278, and then identifies the material that should be protected in field 280.

The next question in field 282 (FIG. 8) is directed to whether or not the information has been published, presented, or released prior to the event connected to the present PIRA form. If the answer is yes, then the user list in field 284 the publication or event where this public disclosure occurred. Field 286 is directed to whether the final releasable item includes a copyright notice.

The next part of the PIRA form deals with DFOISR (Directorate of Freedom of Information Security Review). If the information has been through DFOISR, the author clicks "yes" in field 288, and the DFOISR number is entered in field 294. Fields 290 and 292 are directed to whether any modifications have been made to the information since the DFOISR number was issued.

The first level of approvers for the PIRA form is filled-in in fields 296, 298 and 300. In one approach, the author picks the first level of approvers, which includes the author's manager, program manager (project lead), and optionally, a technical peer reviewer.

Since the intranet includes a plurality of users enrolled therein, with each user having associated personnel information stored within the intranet, a profile of the PIRA form may be created in response to accessing the associated personnel information of the author. Consequently, in another approach, the first level of approvers is filled in automatically based upon the personnel information of the author. As a minimum, the author's manager is automatically filled in, with the author providing the program manager and the technical peer reviewer.

The first level of approvers reviewing the PIRA form do so concurrently. That is, each approver receives notice to review the PIRA form, via e-mail, at the same time. The e-mail includes a hyperlink to the PIRA form. To select and/or change an approver, the author clicks on a corresponding "Select/Change" field (not shown). The selection process works here just as it does in the Author Selection field, which means that any new approvers must be listed in the company directory.

After the required fields have been filled-in, the author may choose to either "save as draft" or "submit." If an attachment is being submitted with the PIRA form, it must be saved as a draft prior to being submitted. If the PIRA form is ready for review, the author clicks on the "Submit" field.

Figure 3:
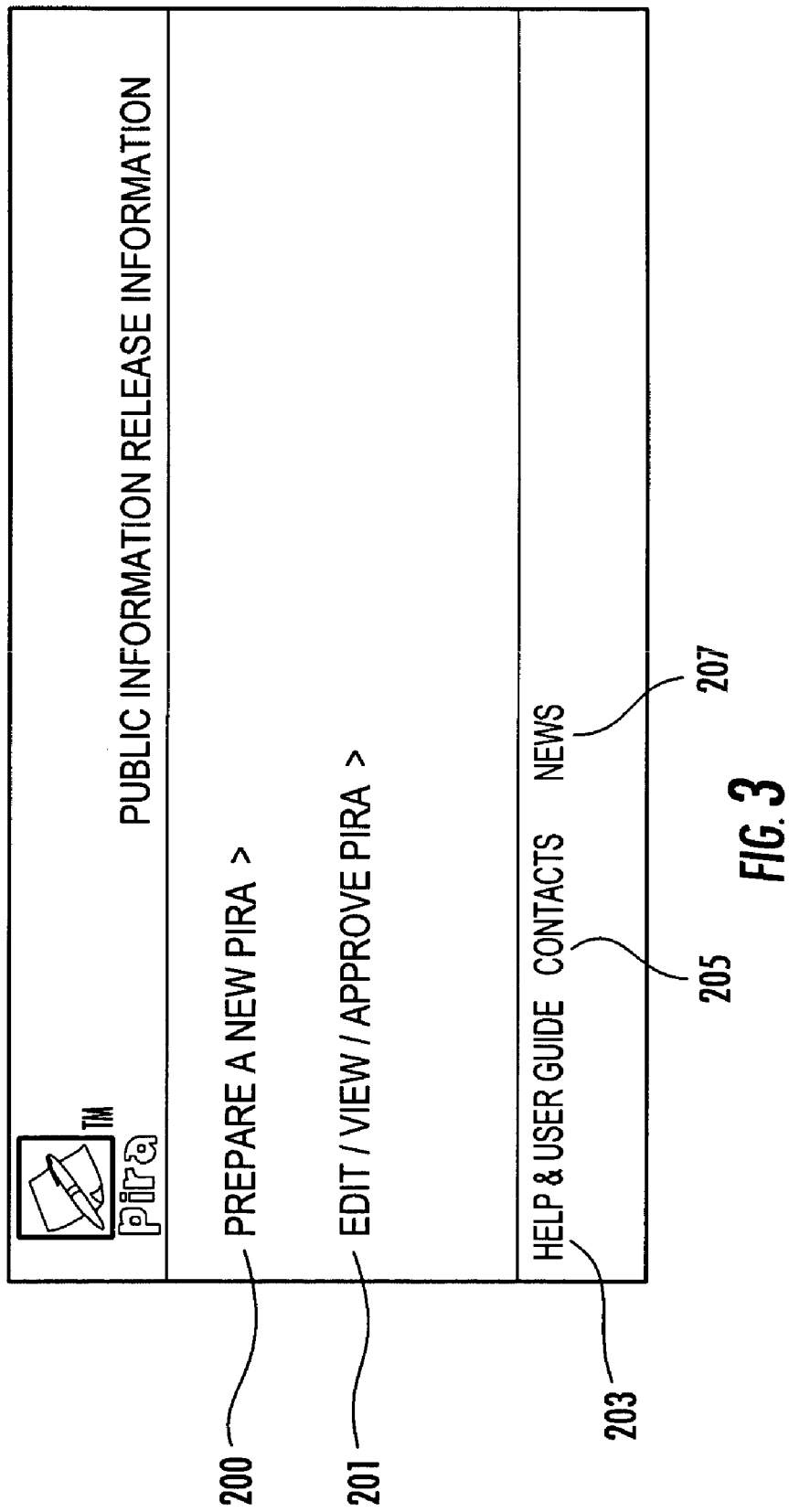
Figure 9:
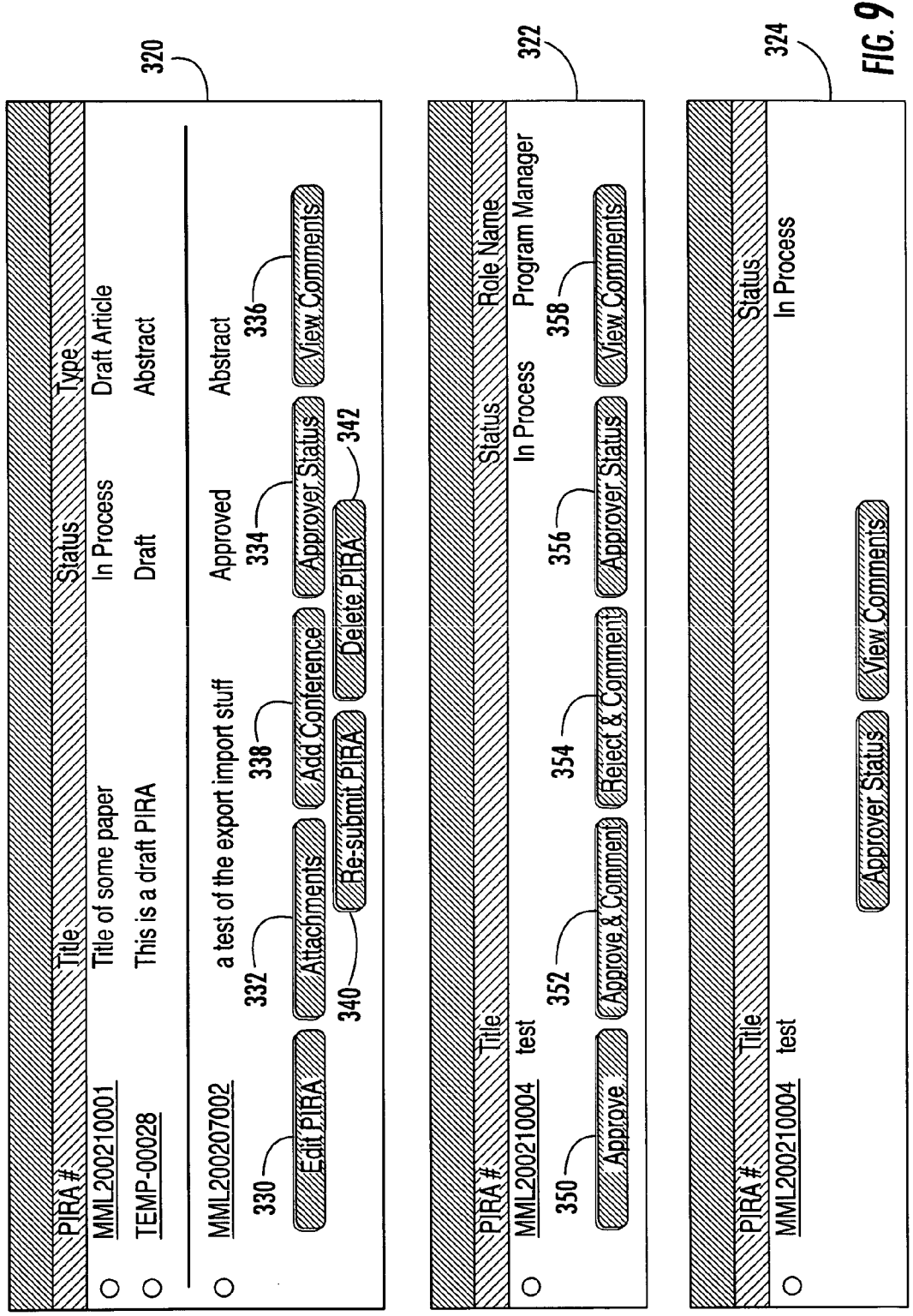

After the PIRA form has been submitted, the author can find it by clicking the "Edit/View/Approve PIRA" in field 201 on the application's home page as illustrated in FIG. 3. Clicking on field 201 causes the following to be displayed, as illustrated in FIG. 9: "Items You Have Created" in display 320, "Items You Need To Approve" in display 322 and "Items You Have Previously Approved" in display 324. Clicking on a hyperlinked title in any of these displays will bring up a printable version of the PIRA form. The PIRA forms accessed from displays 322 and 324 can not be edited. However, the PIRA forms accessed from display 320 may be edited when they have a status of "Draft."

In the "Items You Have Created" display 320, the author can select the appropriate draft PIRA form and then the "Edit PIRA" option in field 330. When the changes have been completed, the author clicks on the "Save as Draft" field to maintain the PIRA form as a draft or clicks on the "Submit" field to start the approval process.

The author may edit the PIRA form only while it is in the draft mode. Once the PIRA form is submitted, its status will change from "Draft" to "In Process." If changes need to be made after the PIRA form has been submitted, the author should contact the system administrator, which is typically the site administrator. The function of the system administrator will be discussed in greater detail below.

While the PIRA form is in the draft mode, the "Attachments" option 332 can be used to upload files that support the PIRA form, or to delete previously uploaded files. After a PIRA form has been submitted, only the system administrator can add or remove attachments to the PIRA form. If the author answered yes to "Does the paper include any DOD Classified information?" attachments will not be submitted with the PIRA form.

To add an attachment, the author clicks on the field next to the appropriate draft PIRA form and selects the "Attachments" field 332. The author clicks the "Browse" field to navigate to the file to upload, and clicks on the file name, and then clicks "open." The file name and path will now appear in the text box. The author clicks on the "Add Attachments" field to upload the file. If the upload is successful, a confirmation message will appear at the bottom of the page. Additional files may be uploaded. The author selects "Back" if finished with the attachments.

If the upload is unsuccessful, a "file was not uploaded" message will appear at the bottom of the page. To remove an attachment, the author clicks the "Delete" field next to the appropriate file name. A draft PIRA form may be deleted by clicking the field next to the appropriate PIRA form, and then clicking the "Delete" field 342. Once a draft PIRA is deleted, it cannot be recovered. To recreate it, the author will need to re-enter the information on a new PIRA form.

Once a PIRA form has been submitted, it will appear as "In Process" in the "Items You Have Created" display 320. While a PIRA form is in process, the author may see the approver status and comments via fields 334 and 336. To see where a PIRA form is in the approval process, the author clicks on the field next to the PIRA form, and clicks on the "Approver Status" field 334. An Approval Status page will list the names and roles of the people who need to approve the corresponding PIRA form. The status column may display the following: Due—The PIRA form has been submitted to the person and is awaiting review; Approved—The PIRA form has been approved and the date of approval is listed; and Pending—The PIRA form has not yet been submitted for approval to this person.

If a PIRA form has been rejected, the status will be listed as "Rejected" both on the Approval Status page and on the "Items You Have Created" display 320. To see any comments a reviewer has made regarding the PIRA from, the author clicks on this field and then clicks on the "View Comments" field 336. Once the PIRA form has been approved, the status will change to "Approved." The author may view the approval status and comments for an approved PIRA. For certain types of PIRA forms, the author may select the "Add Conference" option 338 and "Re-Submit" field 340.

If an approved presentation or final article is to be presented at a news conference, the author may use the "Add Conference" field 338 to submit the information for a news conference. The author clicks the field next to the PIRA form and then clicks the "Add Conference" field 338. The new information will need to be filled in, and then the author clicks on "Submit." This new PIRA form corresponding to the previously approved information will be assigned a new file number and will have a shortened review cycle.

The Add Conference field 338 may only be selected for PIRA forms that had "presentation" or "final article" as their type. If the type was "draft article" or "abstract," the "Re-submit" field is used. The "Re-submit" field uses an approved abstract or draft article as the basis for submitting a new PIRA presentation. The new PIRA form will have the same approval cycle as the original PIRA form.

To re-submit the PIRA form, the author clicks on the field next to the title and then clicks the "Re-Submit" field 340. The answers to the questions on the page are verified and the author then clicks "Save." If the PIRA form does not contain DOD classified material, the author will be prompted to upload the paper.

If a PIRA form is rejected, the status will be listed as "Rejected." The author may now add or delete attachments, if needed, and then edit the PIRA from to resubmit. To edit a rejected PIRA form, the author clicks the field next to the PIRA number and then clicks the "Edit PIRA" field 330. The author makes any necessary changes and then scrolls down to the bottom of the form. A new text box will be displayed so that the author can enter comments to explain how the changes address the reviewer's reasons for rejecting the original submission. Any changes made to the attachments or to the form should be listed, and then the author clicks on the "Save" field. The PIRA form will then be resubmitted to the first person in the approval cycle.

For each person listed as an approver on the PIRA form, they will receive e-mail notification asking them to go to the PIRA home page. From there, the approver clicks on the "Edit/View/Approve PIRA," field 201 and goes to the "Items You Need to Approve" display 322. Each PIRA form listed will have the number, title, submission status, and approver's assigned role. The approver can review the PIRA form by clicking on the PIRA number, which is a hypertext link. After the review has been completed, the approver clicks on the field next to the number and then clicks the appropriate field: Approve 350, Approve and Comment 352 or Reject and Comment 354. The Approver Status 356 and View Comments 358 that previous approvers have made may also be reviewed.

For the assigned role of the Program Manager, they must use the "Approve & Comment" option 352 rather than the "Approve" option 350. A new page will be displayed with specific questions for the Program Manager's review. The "List PIRAs Previously Approved by You" option is used to display any PIRA form that the approver has approved in the past. The approver may also view the approver status and any comments that previous approvers have made. The author clicks the PIRA number to view a selected PIRA form.

If an organization contact is the author of the PIRA form being submitted, there will be a link to an organization report from the home page. This option allows the organization contact to view the details of any PIRA form submitted for the applicable organization. If the organization contact is responsible for more than one organization, they will see all of the PIRA forms from these applicable organizations on one report. The home page of the PIRA form also includes links to a help and user guide 203, current news 205 and contact information 207.

As mentioned above, each site has an administrator. The administrator's functions will now be discussed with reference to FIGS. 10-13. When a site is created, the administrator sets up the site name and one primary system administrator. The system administrator then sets up at least one organization for the site, and may add other administrators who will have authority to perform all site administrative functions.

Figure 10:
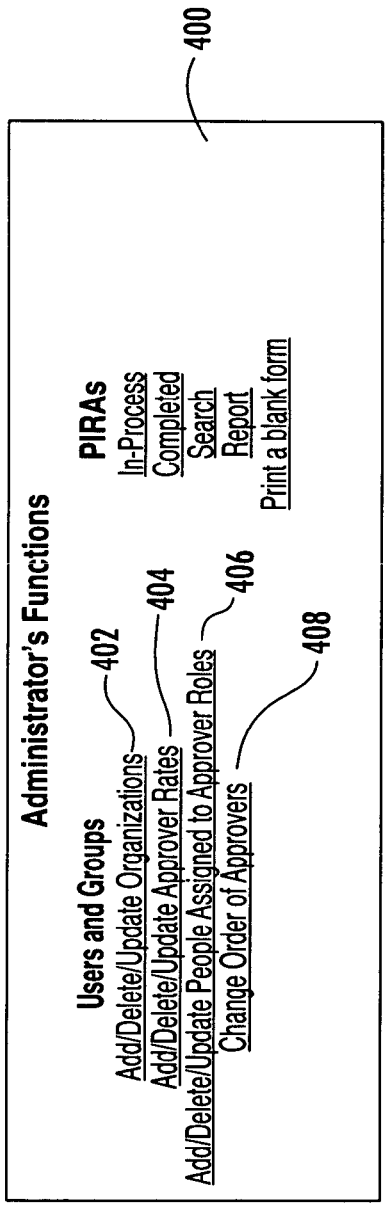
Figure 11:
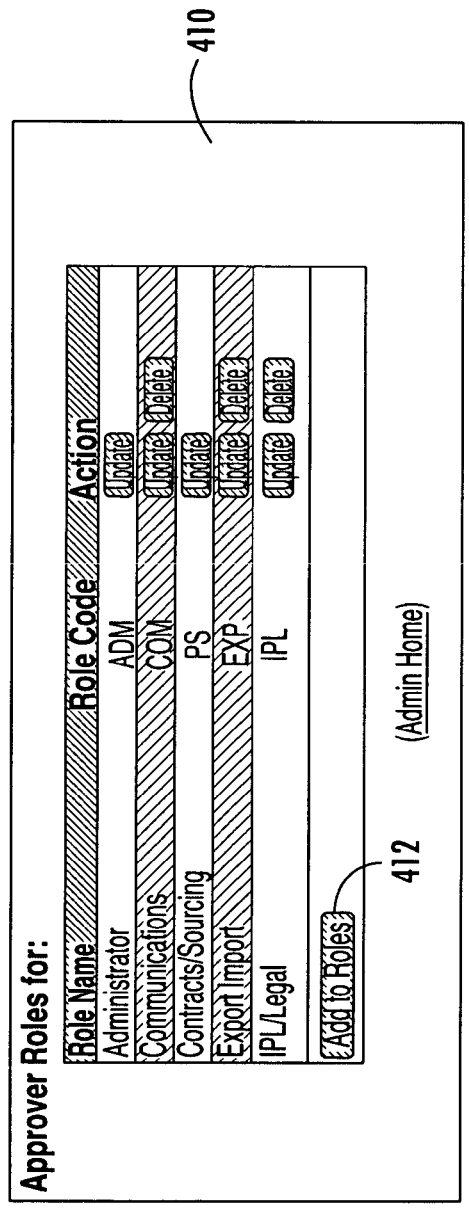

As shown in display 400 of FIG. 10, the primary system administrator's functions are divided into two categories, which are "Users and Groups" and "PIRAs." Under "Users and Groups," the system administrator may control what organizations their particular site has in field 402, what the approver roles are in field 404, and which individuals are assigned to these roles in field 406. The system administrator also places the approvers in the appropriate order for their site in field 408.

As soon the site has been set up, the administrator will add at least one organization. The administrator clicks the "Add/Delete/Update Organizations" field 402 and then clicks the "Add New Organization" field. The administrator types in the organization name and clicks the "Select/Change" field to add the contact person. When the administrator clicks the "Select/Change" field, the Employee Selector window will open so that the contact person can be added. The last name or partial last name of the person to add is entered, and the administrator clicks the "Search" field. The administrator may also click the "Dept" field and search by department number.

The search results list will appear in the window. If the correct name does not appear in the list, the administrator clicks the "Cancel" field and does another search. If the person to be added is in the list, the administrator clicks on that name. The Employee Selector window will then close, and the contact person's information will be filled in on the "Adding an Organization" field. After the administrator saves the changes, the administrator is returned to the Organization Page. The new organization will now be on the site list provided in field 202.

If the administrator wants the contact for their organization (s) to be an approver, the administrator clicks on the "yes" field next to the question "Use the organization contact as an approver?" The default answer to this question is "no," so if the administrator does not change it, the organization contact will not be an approver. If the administrator changes the default after the organization is set up, the organization contact will only be added as an approver for PIRAs submitted after the change was made.

After an organization has been established, the administrator may update its information. To update, the administrator clicks the "Update" field next to the organization name. The update screen contains the same information as when a new organization is added. If an organization name is changed, the new name will replace the previous name in all draft, in-process, and completed PIRA forms.

To delete an organization, the administrator clicks the "Delete" field. A "Deleting an Organization" page will appear. When deleted, the administrator will also be asked to "Confirm Deletion" before returning to the Organization Page. The deleted organization will no longer be on the site's organization list.

Each site has three default approver roles: Contracts/Sourcing, Communications, and IPL/Legal as illustrated in display 410 in FIG. 11. The administrator has the option of selecting a security administrator and an export/import administrator.

To add an approver role, the administrator clicks the "Add to Roles" field 412. The administrator will need to fill in the following information: Role Name and Role Code. Role Name can be any series of alphanumeric characters up to a maximum of 45 characters and spaces. Role Code includes one to three alphanumeric characters. Once the administrator sets up a new role, the administrator assigns at least one person for this task.

The administrator may update any of the approver roles by clicking the "Update" field next to the role name. The administrator may change the Role Name and Role Code for all roles except for Administrator and Contracts/Sourcing. The administrator may change the Role Name for these two, but cannot change the Role Code.

For any other roles, the administrator just types in the new name and/or code. The form will not be saved until the fields are filled in. Once the form is completed, the administrator clicks the "Save" field.

To delete an approver role, the administrator clicks the "Delete" field to the role to be removed. The administrator will be asked to confirm their deletion choice. If the default roles set up for an organization need to be modified, the administrator will then need to assign people to function in these roles. The application administrator will have assigned a default administrator when a particular site is set up. The administrator of the new site may assign additional administrators, change the default administrator, and/or assign people to other roles.

The default person assigned to the approval role is the one who receives notification that approval is needed for that role. Non-default people do not receive notification unless the administrator edits the approver list for a specific PIRA form. Only one person may be the default in a role.

To add an approver or approver, the administrator clicks the "Add to Roles" field 412. On a different page, the administrator will first choose the Approver Role from a drop-down box, and indicate if the person is the default for this role. The system will assign a value of "no" unless the administrator clicks the "yes" field. The administrator then clicks the "Select/Change" field to add the person. Selecting a person with the Employee Selector window will fill in both the Name and NT user id boxes on this page. When finished, the administrator clicks the "Save" field and the person will be added in that role.

The administrator may update a person's role by either changing the assigned role or changing whether the person is the default assignee for the role. To do so, the administrator clicks "Update" next to the NT user id and changes the information on the next page, and clicks "Save" when done. If someone has been removed from a default role, someone else should be designated as a default before ending the session.

To remove a person from an approver role, the administrator clicks the "Delete" field next to the NT user id. On the next page, this deletion is confirmed by clicking on the "Confirm Deletion" field.

If the person being deleted is in the default role, another person should be added to that role before ending the session. If there is no default designated for a role, PIRA forms will not be sent to that area for approval. In addition, if there is no default administrator, that particular site will no longer show up on the site list in the PIRA form. The administrator will thus need to delete the default person and then designate another person in that role as the default by updating that person's information and clicking the "yes" field by the question "Default?"

The administrator may also change the order in which PIRA forms are sent to the approvers by clicking "Change Order of Approvers" in field 408. The Approver Role Order page lists all the roles for the administrator's site and the current order. This order may be changed by typing numbers in the "New Order" column, and then clicking the "Save" field. This new order does not affect in-process PIRA forms, but it will affect all those created after this change is made.

From the Administrator's Functions page as shown in display 400, the administrator can view information about in-process and completed PIRA forms. An in-process PIRA form is one that has not completed the review cycle. One or more approvers may have approved a PIRA form, but it is considered in process until all approvals have been received.

When the administrator clicks the "In-Process" field, the administrator will see a list sorted by PIRA form numbers. The administrator may view any PIRA form by clicking its hyperlinked title. The administrator may also perform the following actions by clicking the appropriate field "Edit PIRA" and "Edit Approver List" next to the disclosure, and then clicking the appropriate fields at the bottom of the page.

When the "Edit PIRA" form function is selected, the administrator may edit the information that the author submitted on the PIRA form. After any changes have been made, the administrator clicks the "Save" field. When the "Edit Approver List" field is selected, this allows the administrator to work with the Approver List submitted for a particular PIRA form. The administrator clicks the field next to the PIRA number and then clicks the "Edit Approver List" field.

A new page will list all the approvers, their roles, and their status. Status may be one of the following: Due—This approver has been asked to review the PIRA form but has not yet done so; Pending—This approver has not yet been asked to review the PIRA form; Approved—This approver has reviewed the PIRA and approved the request; and Rejected—This approver has reviewed the PIRA and rejected the request. Rejection comments can be viewed using the "View Comments" field.

The administrator can select a different approver for any PIRA form that has a status of "Due" or "Pending" by clicking the "Change" field. The Employee Selector page will appear for those approvers chosen on the PIRA form and also for the Organization Approver Role. For other Approver Roles, the administrator will see a list of persons assigned to that role, and may choose another person from the list. If the status is "Due," the previous approver will be sent an e-mail informing them that the review is no longer required The administrator may also insert an additional reviewer by clicking the "Insert" field before the row where the new reviewer is to be added. The Employee Selector page will appear for a directory search, and the person chosen will be added to the list with the role of Staff. The administrator may also perform the following actions "Attachments," "Approval Status," "View Comments," and "Delete PIRA" by clicking the appropriate fields, as will be discussed in greater detail below.

Clicking the "Attachments" field allows the administrator to add attachments to the PIRA form or to delete attachments already submitted. The "Browse" field is clicked to navigate to the file that is to be uploaded. After the file is open, the file name and path will now appear in the text box. The file is uploaded by clicking the "Add Attachments." A message confirming successful upload will appear at the bottom of the page. This field may also be used to upload additional files, or remove any uploaded files, or click the "Return" field if finished with the attachments. To remove an attachment, the "Delete" field next to the appropriate file name is selected.

Selecting the "Approver Status" field allows the administrator to view the status of a PIRA form by selecting the field next to the PIRA number and then selecting the "Approver Status" field. An Approval Status page will open with a list of all approvers, the status of their reviews, the date of any actions taken, and the reviewers' phone numbers. To send an e-mail to a reviewer, the administrator selects the hyperlinked name. To print this page, the administrator selects the "Print" field at the bottom of the page.

Selecting the "View Comments" field will display any approver comments submitted for the PIRA. Selecting the "Delete PIRA" field removes a PIRA from the system. Once the delete is confirmed, the PIRA form is removed and cannot be restored.

When a PIRA has finished the review cycle, the PIRA form is now considered complete. As with in-process PIRA forms, when the administrator selects "Completed," a list sorted by PIRA numbers will be displayed. The fields "Edit PIRA," "Attachments," "Approver Status," "View Comments," and "Delete PIRA" perform the same actions that they do for the in-process disclosures. The "Edit Approver List" function is not available for completed PIRA forms, but tracking information can be entered for the PIRA.

The administrator can enter tracking information for a completed PIRA form by selecting the field next to the PIRA number and then selecting the "Edit Tracking Info" button. The Tracking Information page fills in the PIRA file number and allows the following information to be entered: Date final draft received; Date sent to Director of Technical Operations; Director of Technical Operations; Award Granted (Yes/No) and Reason for award denial. After entering the information, the "Save" field is selected.

The Search option in the display allows the administrator to find PIRA forms using various criteria. The administrator may search by the following: Type of PIRA; File Number; Title; IR&D Project; Contract Title; Start Date and Enter Date. The search criteria is entered and then the administrator clicks on the "Search" field. The results will appear on the same page underneath the search criteria form. The administrator may search with new criteria by selecting the "Reset" field, entering the new criteria, and selecting the "Search" field.

The "Report" function lists all PIRA forms for the administrator's site, and the report is sorted first by organization name and then by the PIRA number. The "Print A Blank Form" function produces a blank PIRA form that can be printed by using the browser's print function.

The system administrator's function have just been discussed, but now the application administrator's functions will be discussed. The application administrator is responsible for the overall management, operation, and support of the PIRA application process. As an application administrator, the administrator can add or delete other administrators, create and update sites, update the news screen, and run reports. The application administrator can also have access to the administrative functions of all other sites.

Figure 12:
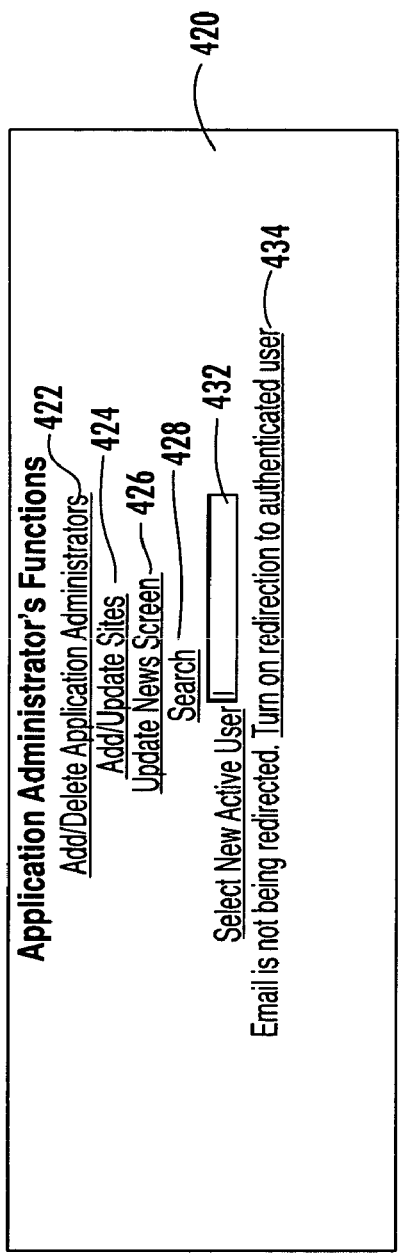

To add or delete an application administrator, the application administrator clicks the "Add/Delete Application Administrators" 422 field in display 420 (FIG. 12). To add an application administrator to the authorized list, the applicant administrator selects the "Add New Administrator" field. The "Administrator Selector" window will appear. To search, the "Last Name" or "Dept" field is selected, and the last name or the department number (or partial information) is filled in, and then the "Search" field is selected. When the search results are displayed, the appropriate name is clicked on. If the person is already listed as an application administrator, a message stating this fact will appear.

To delete an application administrator from the list, the "Delete" field is clicked next to the administrator's name. A message will then ask for this deletion to be confirmed. If "OK" is clicked, then the person will be removed from the list. If the "Cancel" button is clicked, the application administrator will not be removed.

Figure 13:
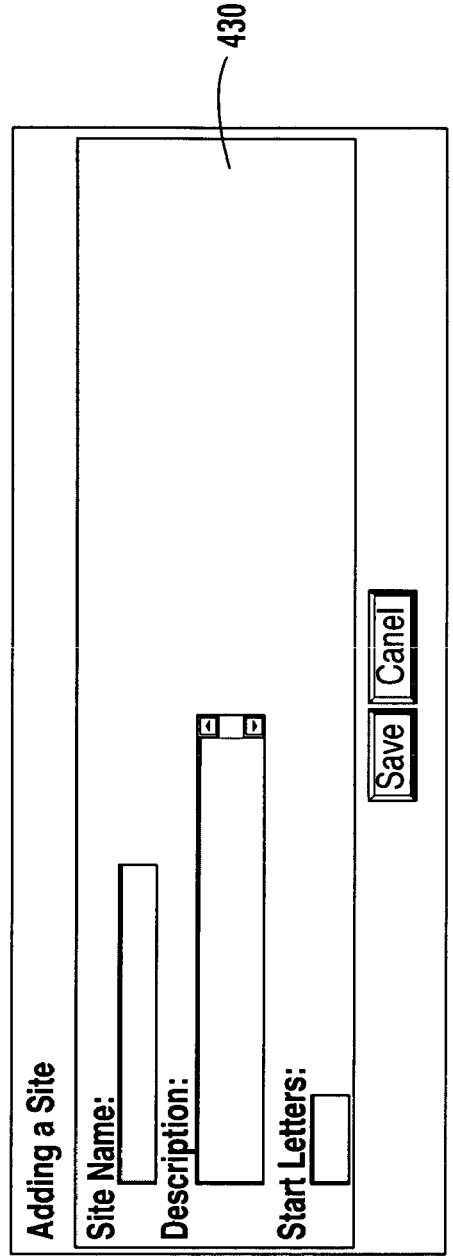

A site must be defined with some basic information before it can appear in the PIRA Form's site information drop-down box. The application administrator may create a new site by providing this information, and the application administrator may also change the definition of an existing site. To add a site, the "Add/Update Sites" field 424 is clicked, and then the "Add New Site" field is clicked and the following information is entered, as shown in display 430 (FIG. 13).

The Site Name is displayed in a drop-down box. The assigned site name allows the author to clearly identify the appropriate site when filling out the PIRA form. The description should include a contact name and phone number. The Start Letters is a one to three character code that may be alpha, numeric, or alphanumeric. This code must be different from other site codes already defined in PIRA, and once established, it cannot be changed.

The information will not be saved until all the fields are filled in. Once the form is completed, the application administrator clicks the "Save" field and the site will now be added. The application administrator may also click the "Cancel" field to return to the "Site List" page.

Many other modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for processing a public information release authorization (PIRA) request over an intranet, the method comprising:

accessing via the intranet a PIRA form comprising a plurality of fields to be filled-in, the plurality of fields including a date field indicating when public information is to be released, a title field indicating a title of the public information, an author field indicating an author of the public information, and an abstract field indicating at least a summary of the public information;

the form further comprising a type field indicating a format of the public information, with the type field being configured as a pull-down menu for providing the following items to select from: an abstract, a draft article, a final article, a book, a video, and a World Wide Web item;

filling in the plurality of fields in the PIRA form;
submitting the PIRA form to at least one approver via e-mail with the email including a hyperlink to the PIRA form; and transmitting comments for the PIRA form by the at least one approver via e-mail.

2. A method according to claim 1 wherein the intranet includes a plurality of users enrolled therein with each user having associated personnel information stored within the intranet, the method further comprising:
selecting a first level of approvers from among the plurality of users for reviewing the PIRA form; and
transmitting a first notification message via e-mail to the first level of approvers, the first notification message having a hyperlink to the PIRA form.

3. A method according to claim 2 wherein the first level of approvers comprises at least one of a manager, a program manager and a technical peer reviewer.

4. A method according to claim 2 wherein the first level of approvers is selected by the author.

5. A method according to claim 2 further comprising creating a profile of the PIRA form in response to accessing associated personnel information of the author; and wherein at least one of the first level of approvers is selected based upon the created profile.

6. A method according to claim 2 wherein the first level of approvers reviews the PIRA form concurrently.

7. A method according to claim 2 further comprising:
selecting a second level of approvers from among the plurality of users for reviewing the PIRA form; and
transmitting a second notification message via e-mail to the second level of approvers, the second notification message having a hyperlink to the PIRA form.

8. A method according to claim 7 wherein the second level of approvers comprises at least one of a security administrator, a system administrator, a contracts administrator, a communications administrator, an export/import administrator and a legal administrator.

9. A method according to claim 7 wherein the second level of approvers is selected by a system administrator.

10. A method according to claim 7 wherein each of the second level of approvers reviews the PIRA form sequentially.

11. A method according to claim 10 further comprising stopping approval of the PIRA when one of the second level of approvers rejects the PIRA form.

12. A method according to claim 1 wherein filling in the abstract field comprises attaching an attachment to the PIRA form for providing additional information on the public information.

13. A method according to claim 1 wherein the PIRA form further comprises a proprietary information field indicating if the public information includes proprietary information.

14. An intranet for processing a public information release authorization (PIRA) request comprising:
at least one server for providing a PIRA form comprising a plurality of fields to be filled-in, the plurality of fields including a date field indicating when public information is to be released, a title field indicating a title of the public information, an author field indicating an author of the public information, and an abstract field indicating at least a summary of the public information;
the form further comprising a type field indicating a format of the public information, with the type field being configured as a pull-down menu for providing the following items to select from: an abstract, a draft article, a final article, a book, a video, and a World Wide Web item;
a first user computer cooperating with said at least one server for
accessing the PIRA form and filling in the plurality of data field, and submitting the PIRA form to at least one approver via e-mail with the email including a hyperlink to the PIRA form; and
a second user computer cooperating with said at least one server for transmitting comments on the PIRA form by the at least one approver via e-mail.

15. An intranet according to claim 14 wherein a plurality of users is enrolled in the intranet, with each user having associated personnel information stored within said at least one server, said first user computer further cooperating with said at least one server for performing the following:
selecting a first level of approvers from among the plurality of users for reviewing the PIRA form; and
transmitting a first notification message via e-mail to the first level of approvers, the first notification message having a hyperlink to the PIRA form.

16. An intranet according to claim 15 wherein said first user computer further cooperates with said at least one server for creating a profile of the PIRA form in response to accessing associated personnel information of the author; and wherein at least one of the first level of approvers is selected based upon the created profile.

17. An intranet according to claim 15 wherein said first user computer further cooperates with said at least one server for performing the following: selecting a second level of approvers from among the plurality of users for reviewing the PIRA form; and
transmitting a second notification message via e-mail to the second level of approvers, the second notification message having a hyperlink to the PIRA form.

18. An intranet according to claim 17 wherein the second level of approvers comprises at least one of a security administrator, a system administrator, a contracts administrator, a communications administrator, an export/import administrator and a legal administrator.

19. An intranet according to claim 17 wherein the second level of approvers is selected by a system administrator.

20. An intranet according to claim 17 wherein each of the second level of approvers reviews the PIRA form sequentially.

21. An intranet according to claim 17 wherein said first user computer further cooperates with said at least one server for stopping approval of the PIRA when one of the second level of approvers rejects the PIRA form.

22. An intranet according to claim 14 wherein the first level of approvers comprises at least one of a manager, a program manager and a technical peer reviewer.

23. An intranet according to claim 14 wherein the first level of approvers is selected by the author.

24. An intranet according to claim 14 wherein the first level of approvers reviews the PIRA form concurrently.

25. An intranet according to claim 14 wherein filling in the abstract field comprises attaching an attachment to the PIRA form for providing additional information on the public information.

26. An intranet according to claim 14 wherein the PIRA form further comprises a proprietary information field indicating if the public information includes proprietary information.

27. A computer-readable medium having computer-executable instructions for causing user computers coupled to at least one server and defining an intranet therewith to perform steps comprising:

accessing a public information release authorization (PIRA) form over the intranet using a first one of the user computers cooperating with the at least one sewer, the PIRA form comprising a plurality of fields to be filled-in, the plurality of fields including a date field indicating when public information is to be released, a title field indicating a title of the public information, an author field indicating an author of the public information, and an abstract field indicating at least a summary of the public information;

the form further comprising a type field indicating a format of the public information, with the type field being configured as a pull-down menu for providing the following items to select from: an abstract, a draft article, a final article, a book, a video, and a World Wide Web item;

filling in the plurality of fields in the PIRA form via the first one of the user computers;

submitting the PIRA form over the intranet to at least one approver via e-mail with the email including a hyperlink to the PIRA form; and transmitting comments for the PIRA form by the at least one approver via e-mail using a second one of the user computers cooperating with the at least one sewer.

28. A computer-readable medium according to claim 27 wherein the intranet includes a plurality of users enrolled therein with each user having associated personnel information stored within the intranet, the computer-readable medium further having computer-executable instructions for causing the first one of the user computers to perform the following steps:

selecting a first level of approvers from among the plurality of users for reviewing the PIRA form; and transmitting a first notification message via e-mail to the first level of approvers, the first notification message having a hyperlink to the PIRA form.

29. A computer-readable medium according to claim 28 further having computer-executable instructions for causing the first one of the user computers to create a profile of the PIRA form in response to accessing associated personnel information of the author; and wherein at least one of the first level of approvers is selected based upon the created profile.

30. A computer-readable medium according to claim 28 further having computer-executable instructions for causing the first one of the user computers to perform the following steps:

selecting a second level of approvers from among the plurality of users for reviewing the PIRA form; and transmitting a second notification message via e-mail to the second level of approvers, the second notification message having a hyperlink to the PIRA form.

31. A computer-readable medium according to claim 30 wherein the second level of approvers comprises at least one of a security administrator, a system administrator, a contracts administrator, a communications administrator, an export/import administrator and a legal administrator.

32. A computer-readable medium according to claim 30 wherein the second level of approvers is selected by a system administrator.

33. A computer-readable medium according to claim 30 wherein each of the second level of approvers review the PIRA form sequentially.

34. A computer-readable medium according to claim 30 further having computer-executable instructions for causing the first one of the user computers to stop approval of the PIRA when one of the second level of approvers rejects the PIRA form.

35. A computer-readable medium according to claim 27 wherein the first level of approvers comprises at least one of a manager, a program manager and a technical peer reviewer.

36. A computer-readable medium according to claim 27 wherein the first level of approvers is selected by the author.

37. A computer-readable medium according to claim 27 wherein the first level of approvers reviews the PIRA form concurrently.

38. A computer-readable medium according to claim 27 wherein filling in the abstract field comprises attaching an attachment to the PIRA form for providing additional information on the public information.

39. A computer-readable medium according to claim 27 wherein the PIRA form further comprises a proprietary information field indicating if the public information includes proprietary information.

* * * * *

UNITED STATES PATENT AND TRADEMARK OFFICE
CERTIFICATE OF CORRECTION

PATENT NO. : 7,496,632 B2  Page 1 of 1
APPLICATION NO. : 10/617065
DATED : February 24, 2009
INVENTOR(S) : Chapman et al.

It is certified that error appears in the above-identified patent and that said Letters Patent is hereby corrected as shown below:

Cover Page (75)    Delete: "Melani Langston"
                   Insert: --Melanie Langston--

Column 5, Line 60  Delete: "218 213"
                   Insert: --213--

Column 17, Line 3  Delete: "sewer"
                   Insert: --server--

Column 17, Line 24 Delete: "sewer"
                   Insert: --server--

Signed and Sealed this

Twelfth Day of May, 2009

JOHN DOLL
*Acting Director of the United States Patent and Trademark Office*